US012763817B2

(12) United States Patent
Sjöland et al.

(10) Patent No.: US 12,763,817 B2
(45) Date of Patent: Oct. 13, 2026

(54) CONTROLLERS FOR SETTING REFLECTION PHASES OF ELEMENTS IN A RECONFIGURABLE INTELLIGENT SURFACE

(71) Applicant: Telefonaktiebolaget LM Ericsson (publ), Stockholm (SE)

(72) Inventors: Henrik Sjöland, Lund (SE); Rickard Ljung, Helsingborg (SE); Mojtaba Mahdavi, Lund (SE); Shousheng He, Södra Sandby (SE); Magnus Olsson, Klagshamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 19/107,240

(22) PCT Filed: Sep. 7, 2023

(86) PCT No.: PCT/EP2023/074644

§ 371 (c)(1),
(2) Date: Feb. 27, 2025

(87) PCT Pub. No.: WO2024/052493

PCT Pub. Date: Mar. 14, 2024

(65) Prior Publication Data

US 2026/0222015 A1 Jul. 30, 2026

(30) Foreign Application Priority Data

Sep. 7, 2022 (SE) .................................... 2230278-0

(51) Int. Cl.
*H04B 7/04* (2017.01)

(52) U.S. Cl.
CPC ................................ *H04B 7/04013* (2023.05)

(58) Field of Classification Search
CPC .................................................. H04B 7/04013
See application file for complete search history.

(56) References Cited

U.S. PATENT DOCUMENTS

2002/0070898 A1 6/2002 Vail et al.
2021/0344384 A1 11/2021 Dunna et al.
(Continued)

FOREIGN PATENT DOCUMENTS

EP 2230775 A2 9/2010
EP 2336836 A1 6/2011
(Continued)

OTHER PUBLICATIONS

International Search Report and Written Opinion dated Feb. 5, 2024 for International Application No. PCT/ EP2023/074644 filed Sep. 7, 2023; consisting of 17 pages.
(Continued)

*Primary Examiner* — Jaison Joseph
(74) *Attorney, Agent, or Firm* — Weisberg I.P. Law, P.A.

(57) ABSTRACT

There is provided techniques for setting reflection phases of elements in a reconfigurable intelligent surface. The elements are divided into element subsets with at least two elements per element subset. The reflection phase per each of the elements in each element subset are controlled by a respective local controller of each element subset. The central controller is configured to communicate control messages with the local controllers. The central controller includes processing circuitry. The processing circuitry is configured to cause the central controller to send a first control message towards a first local controller of the local controllers. The first control message includes a description of a first reflection phase specific for a first element subset whose reflection phases are controlled by the first local controller.

20 Claims, 9 Drawing Sheets

(56) References Cited

U.S. PATENT DOCUMENTS

| | | | | |
|---|---|---|---|---|
| 2021/0359408 | A1 | 11/2021 | Theofanopoulos et al. | |
| 2022/0216909 | A1 | 7/2022 | Bengtsson et al. | |
| 2023/0308139 | A1* | 9/2023 | Baligh | H04B 7/04013 |
| 2024/0258708 | A1* | 8/2024 | Soliman | H01Q 19/10 |
| 2025/0028620 | A1* | 1/2025 | Sarangi | G01R 31/31721 |

FOREIGN PATENT DOCUMENTS

| | | | |
|---|---|---|---|
| SE | 2051468 | A1 | 12/2021 |
| WO | 2021237688 | A1 | 12/2021 |
| WO | 2022133952 | A1 | 6/2022 |
| WO | 2022151128 | A1 | 7/2022 |
| WO | 2023147891 | A1 | 8/2023 |
| WO | 2023161428 | A1 | 8/2023 |

OTHER PUBLICATIONS

Araghi, A., Reconfigurable Intelligent Surface (RIS) in the Sub-6 GHz Band: Design, Implementation, and Real-World Demonstration, IEEE Access, Multidisciplinary, Rapid Review, Open Access Journal, vol. 10, Jan. 4, 2022, consisting of 10 pages.

Gong, S., et al., Toward Smart Wireless Communications via Intelligent Reflecting Surfaces: A Contemporary Survey, IEEE Communications Surveys& Tutorials, vol. 22, No. 4, Fourth Quarter, Jun. 22, 2020, consisting of 32 pages.

Swedish Patent and Registration Office Search Report dated Mar. 8, 2023 for Swedish Patent Application No. 2230278-0; consisting of 13 pages.

Di Renzo, M., et al., Smart Radio Environments Empowered by Reconfigurable Intelligent Surfaces: How It Works, State of Research, and The Road Ahead, IEEE Journal on Selected Areas in Communications, vol. 38, No. 11, Jul. 14, 2020, consisting of 76 pages.

Pereira, A., et al., A Low Complexity Sequential Resource Allocation for Panel-Based LIS Surfaces, 2022 IEEE 95th Vehicular Technology Conference (VTC2022-Spring), 2022, consisting of 6 pages.

* cited by examiner

CONTROLLERS FOR SETTING REFLECTION PHASES OF ELEMENTS IN A RECONFIGURABLE INTELLIGENT SURFACE

CROSS-REFERENCE TO RELATED APPLICATIONS

This application is a Submission Under 35 U.S.C. § 371 for U.S. National Stage Patent Application of International Application No.: PCT/EP2023/074644, filed Sep. 7, 2023 entitled "CONTROLLERS FOR SETTING REFLECTION PHASES OF ELEMENTS IN A RECONFIGURABLE INTELLIGENT SURFACE," which claims priority to Swedish Application No.: 2230278-0, filed Sep. 7, 2022, the entireties of both of which are incorporated herein by reference.

TECHNICAL FIELD

Embodiments presented herein relate to methods, a central controller, a local controller, computer programs, and a computer program product for setting reflection phases of elements in a reconfigurable intelligent surface.

BACKGROUND

Reconfigurable intelligent surfaces (RISs) offer an opportunity for improved wireless communication. Specifically, significant gains are envisioned to be made for millimeter wave spectrum, which is the spectrum used in fifth generation and sixth generation telecommunication systems. This spectrum has serious challenges when it comes to propagation and coverage, e.g., due to its support for very high frequency ranges in tens of GHz. The challenges are larger compared to challenges for spectrum with lower frequencies e.g., for so-called sub-6 GHZ frequency bands.

Usage of RIS can vary, but in general an RIS can be configured to reflect wireless signals in a controlled manner, e.g., to steer transmitted signals in a certain direction. This could for example be used to improve overall system coverage, range, and efficiency. RISs are commonly also referred to as large intelligent surfaces, smart reflect-arrays, intelligent reflecting surfaces, passive intelligent mirrors, artificial radio space, and meta surfaces.

In short, the surface of an RIS comprises multiple (e.g., hundreds or thousands) of antenna elements, or just elements for short. Each element can be individually configured, or controlled, to dynamically adjust the reflecting properties of the surface. FIG. 1 shows a typical RIS 110, including a central controller 200 that is individually connected to all the elements 112*a*, 112*b* . . . , 112M. FIG. 2 is a schematic diagram illustrating a communications network 100 where the RIS 110 is shown as facilitating communication between a network node 120 and a user equipment 140 over wireless links 130*a*, 130*b*. This could represent a scenario where a physical object 150 obstructs the line of sight between the network node 120 and the user equipment 140. Other scenarios of usage could include an RIS being part of or connected to a wireless device, for enhancing communication for the device.

In some implementation examples, the RIS does not include any radio frequency (RF) chains to generate or amplify a signal, but the elements are provided rather to modify the properties of a signal by its reflection. The central controller is configured to transmit control signals to tune the properties of each element in the RIS. One example of this is disclosed in A. Araghi et al., "Reconfigurable Intelligent Surface (RIS) in the Sub-6 GHz Band: Design, Implementation, and Real-World Demonstration," in IEEE Access, vol. 10, pp. 2646-2655, 2022, doi: 10.1109/ACCESS.2022.3140278. One issue with this technique for configuring the elements is the implementation complexity when scaling an RIS to a very large number of elements. Future use of RISs might include thousands of elements. It is conceivable to consider the use of printed electronics to solve some of the manufacturing problems, but that has another set of challenges related to the scale and how to manage the controlling of a large number of interconnected elements. Printed electronics has limitations when it comes to miniaturization and number of layers that can be possible to use (compared to silicon based manufacturing procedures). Connecting each element to a central controller leads to several challenges as follows.

One challenge is the wiring congestion between the central controller and elements. This is mainly due to the large number of elements, which accordingly limits the scalability of the RIS. Moreover, the large number of elements increases the computational load of the central controller.

Another challenge is the signal processing needed to be performed by the central unit due to changes in the radio propagation environment. Such changes might cause reprocessing of the whole RIS and consequently reconfiguring all its elements. In other words, the central unit must be aware of, and calculate, the panel arrangements based on the element layout.

These issues imply a very complicated hardware design with both high cost and high implementation complexity as well as increase of hot spots due to uneven power consumption in the RIS (e.g., due to the more complex circuit design). Moreover, in practice, it can limit the ability of scaling up the physical size of the RIS. Hence, issues may arise on scalability and complexity, including uneven power consumption.

SUMMARY

An object of embodiments herein is to provide techniques for setting reflection phases of elements of an RIS that address the above issues.

According to a first aspect there is presented a central controller for setting reflection phases of elements in a reconfigurable intelligent surface. The elements are divided into element subsets with at least two elements per element subset. The reflection phase per each of the elements in each element subset are controlled by a respective local controller of each element subset. The central controller is configured to communicate control messages with the local controllers. The central controller comprises processing circuitry. The processing circuitry is configured to cause the central controller to send a first control message towards a first local controller of the local controllers. The first control message comprises a description of a first reflection phase specific for a first element subset whose reflection phases are controlled by said first local controller.

According to a second aspect there is presented a method for setting reflection phases of elements in a reconfigurable intelligent surface. The elements are divided into element subsets with at least two elements per element subset. The reflection phase per each of the elements in each element subset are controlled by a respective local controller of each element subset. The method is performed by a central controller of the reconfigurable intelligent surface. The central controller is configured to communicate control messages with the local controllers. The method comprises sending a first control message towards a first local controller of the local controllers. The first control message comprises a description of a first reflection phase specific for a first element subset whose reflection phases are controlled by said first local controller.

According to a third aspect there is presented a computer program for setting reflection phases of elements in a reconfigurable intelligent surface, the computer program comprising computer program code which, when run on processing circuitry of a central controller, causes the central controller to perform a method according to the second aspect.

According to a fourth aspect there is presented a local controller for setting reflection phases of elements in a reconfigurable intelligent surface. The local controller is configured to set the reflection phases of elements in a first element subset comprising at least two of the elements. The local controller is configured to communicate control messages with neighbouring local controllers of the reconfigurable intelligent surface. Each of the neighbouring local controllers is configured to set the reflection phases of elements in a respective second element subset, with at least two elements per each of the second element subset. The local controller comprises processing circuitry. The processing circuitry is configured to cause the local controller to receive a first control message. The first control message comprises a description of a first reflection phase specific for the first element subset. The processing circuitry is configured to cause the local controller to send a second control message towards a second local controller of the neighbouring local controllers. The second control message comprises a description of a second reflection phase specific for the second element subset of the second local controller. The second reflection phase is based on the first reflection phase and a geometric relation in the reconfigurable intelligent surface between the first element subset and the second element subset of the second local controller. The processing circuitry is configured to cause the local controller to set the reflection phase of each element in the first element subset in accordance with the description of the first reflection phase.

According to a fifth aspect there is presented method for setting reflection phases of elements in a reconfigurable intelligent surface. The method is performed by a local controller of the reconfigurable intelligent surface. The local controller is configured to set the reflection phases of elements in a first element subset comprising at least two of the elements. The local controller is configured to communicate control messages with neighbouring local controllers of the reconfigurable intelligent surface. Each of the neighbouring local controllers is configured to set the reflection phases of elements in a respective second element subset, with at least two elements per each of the second element subset. The method comprises receiving a first control message. The first control message comprises a description of a first reflection phase specific for the first element subset. The method comprises sending a second control message towards a second local controller of the neighbouring local controllers. The second control message comprises a description of a second reflection phase specific for the second element subset of the second local controller. The second reflection phase is based on the first reflection phase and a geometric relation in the reconfigurable intelligent surface between the first element subset and the second element subset of the second local controller. The method comprises setting the reflection phase of each element in the first element subset in accordance with the description of the first reflection phase.

According to a sixth aspect there is presented a computer program for setting reflection phases of elements in a reconfigurable intelligent surface, the computer program comprising computer program code which, when run on processing circuitry of a local controller, causes the local controller to perform a method according to the fifth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

According to an eight aspect there is presented a system for setting reflection phases of elements in a reconfigurable intelligent surface. The system comprises a central controller according to the first aspect and at least one local controller according to the fourth aspect.

Advantageously, these aspects provide an RIS without suffering from the above disclosed issues.

Advantageously, these aspects provide an RIS that is easily scaled to large sizes. The implementation can be done in the same manner independent of the RIS size, without any need for an increasing number of interconnects with an increasing length, all connected to the central controller. Hence, the manufacturing and assembly will be very similar independent of the RIS size, creating an easy to scale RIS with large flexibility.

Advantageously, these aspects enable the RIS to be flexible in shape. The RIS is enabled to not only come in different sizes, but also in different shapes, without the central controller having to take any immediate actions based on the information given with the new additions or changes of the RIS.

Advantageously, these aspects enable the central controller to be significantly simplified compared to a central unit configured for fully centralized element-specific management. The central controller does not have to support a large number of connections (or the bandwidth required for such connections), and it does not need to calculate each and every individual element configuration. Instead the central controller will only need to determine a control message, e.g. a gradient setting, and communicate that to the local controllers in the RIS. This reduces the required computational complexity, memory for processing a large set of elements and physical package size of the central controller, and further it enables a very similar central controller to be used independent of the RIS size which reduces the design complexity.

Advantageously, these aspects enable the central controller to be relived of the task of managing interconnections with individual elements, as the disclosed techniques are based on a propagation of information between controllers. The central controller is in charge of calculating the overall gradient across the entire RIS, which may or may not take into account geometry and physical size of the entire RIS.

Advantageously, these aspects improve robustness. Since the element subset controllers can be connected to neighbors on all sides and with bi-directional communication, the control messages are not easily disrupted, but can find many alternate paths in case of failures of some local controllers or operate alternate paths simultaneously, with the central controller connected to more than one local controller, to reduce the time required of setting or changing the overall RIS configuration.

Advantageously, these aspects enable low and evenly distributed power consumption, beneficial for heat dissipation aspects. Since the central controller will have a lower complexity than in legacy centralized controlling, the heat dissipation in the central controller is lower. Since it may be difficult to handle high temperatures at a certain location in electronics design, the herein disclosed aspects reduce design complexity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 9 is a schematic illustration of elements and element subsets according to embodiments;

DETAILED DESCRIPTION

Figure 1:
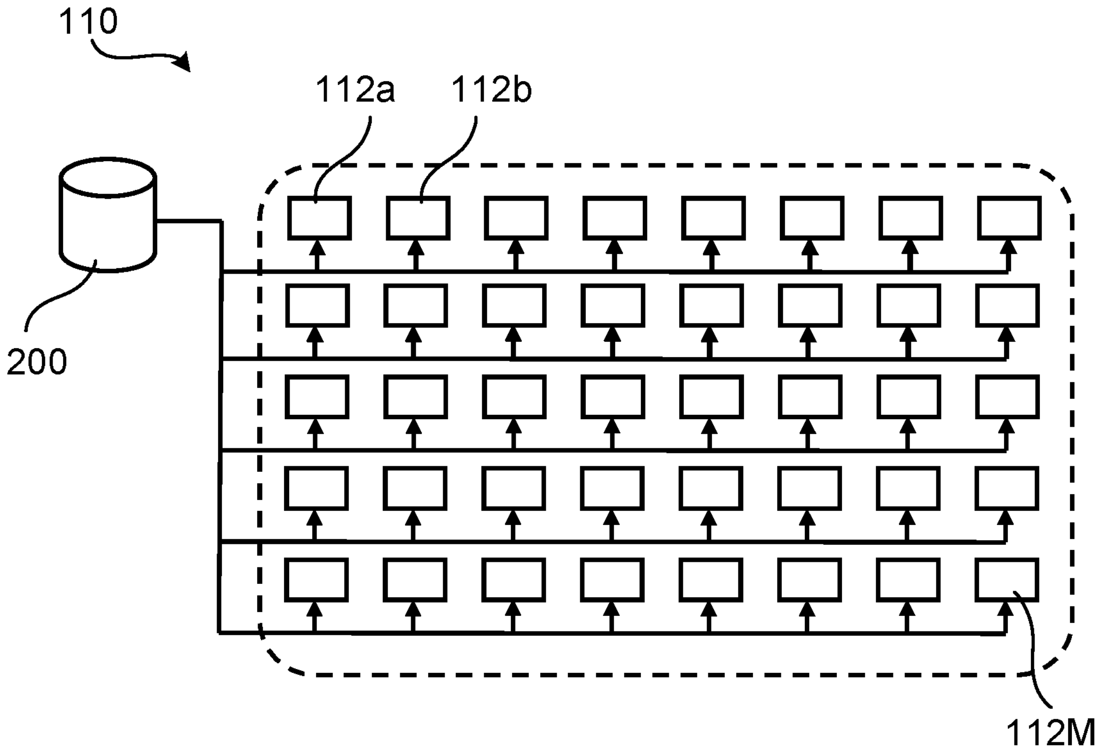
FIG. 1 is a schematic illustration of an RIS according to an example.
Figure 2:
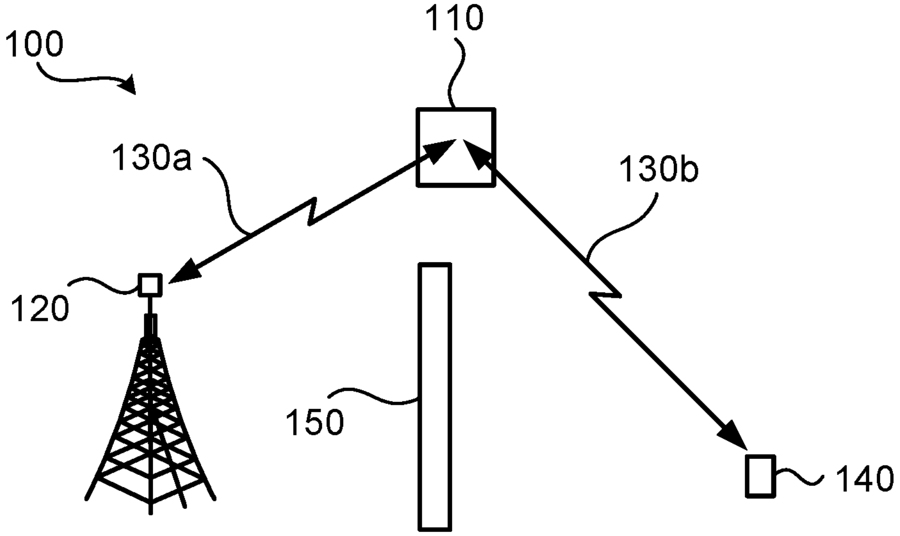
FIG. 2 is a schematic diagram illustrating a communication network according to an example.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to techniques for setting reflection phases of elements 112*a*:112M of an RIS 110. In order to obtain such techniques there is provided a central controller 200, a method performed by the central controller 200, a computer program product comprising code, for example in the form of a computer program, that when run on processing circuitry of the central controller 200, causes the central controller 200 to perform the method. In order to obtain such techniques there is further provided a local controller 300*a*, a method performed by the local controller 300*a*, and a computer program product comprising code, for example in the form of a computer program, that when run on processing circuitry of the local controller 300*a*, causes the local controller 300*a* to perform the method.

Rather than using a single main controller connected to all elements in the RIS 110 where such connection to each element will be complex and expensive, it is hereinafter disclosed a distributed control system where a combination of a central controller and a number of local controllers is used.

The central controller might comprise a receiver to obtain commands from other devices, such as wireless devices 140 or network nodes 120, in the communication network. In one or more examples the central controller and the RIS may be operatively connected to one or more wireless devices, in order to enhance communication for the wireless device(s). The central controller might then be configured to receive a control command from a wireless device 140 or a network node 120, where the control command comprises configuration for setting the reflection phase of the elements 112*a*:112M of the RIS 110. Each local controller connected to a set of nearby elements (denoted element subset), controlling the phase of their reflections. The central controller is therefore configured to send a first control message towards at least one of the local controllers 300*a*:300K, hereinafter denoted a first local controller. The first control message comprises a description of a first reflection phase specific for a first element subset 114*a* whose reflection phases are controlled by the first local controller 300*a*. The amount of interconnect between the elements and the controllers then becomes manageable in terms of both distance and number of elements involved. The local controllers are connected to its neighbors to propagate control settings through the RIS 110. When the control settings are propagated between neighboring local controllers, the phase setting is adapted depending on direction of propagation, so that the entire system becomes self-configuring. Different shapes of the RIS 110 can be used without complex configuration, as the local connections between the local controllers will define all the phase relations of the system.

Figure 3:
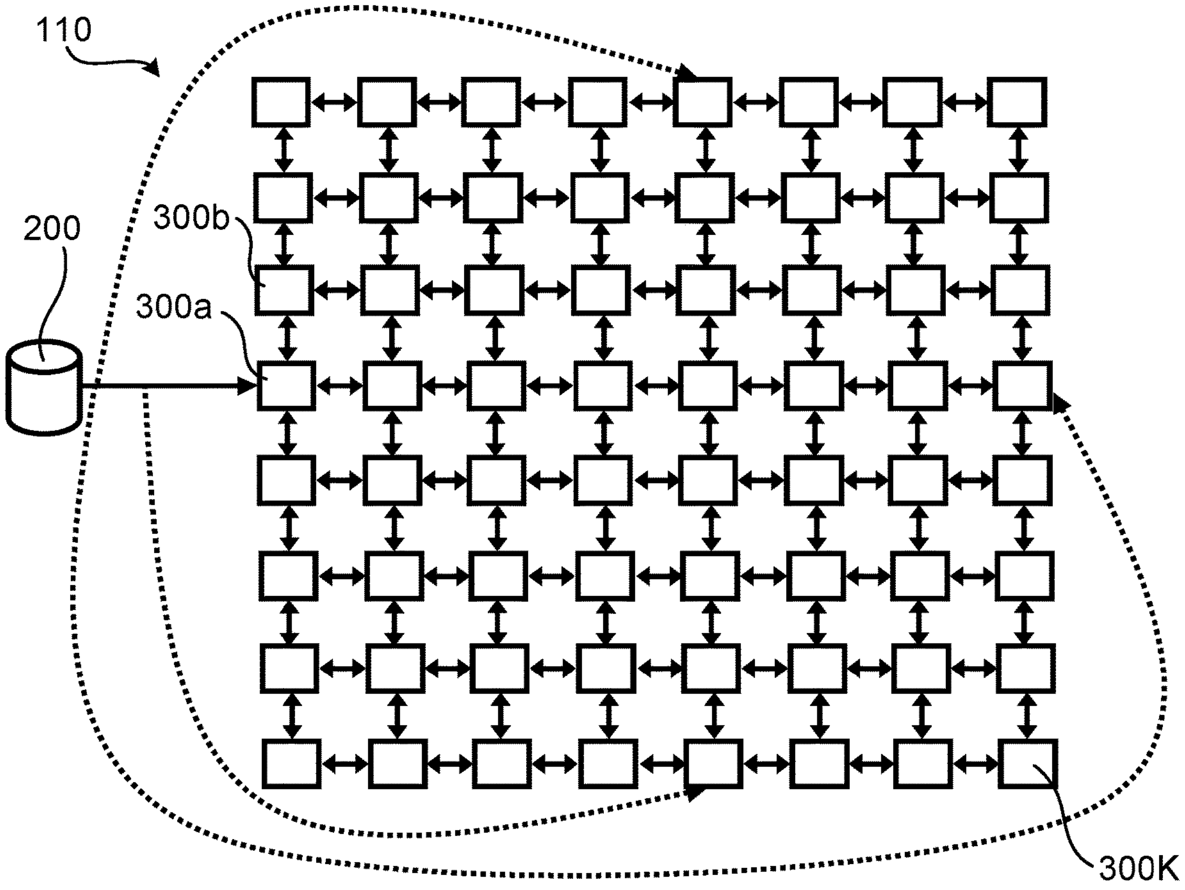
FIG. 3 is a schematic illustration of an RIS according to embodiments.

FIG. 3 shows an example of the proposed architecture for element control in an RIS 110. A control message for setting reflection phases of elements in the RIS 110 is injected by the central controller 200 and then propagated from local controller 300*a* to local controller 300*b*:300K, where each local controller 300*a*:300K is associated with its own element subset (not shown). In some examples, each of the local controllers 300*a*:300K is embedded in, integrated with, or part of, one element 112*a*:112M per each of the element subsets 114*a*:114*d*.

To reflect an incoming planar wave in a certain direction, the phase of the reflection of elements should have a linear gradient across the surface, which gives simple local phase relations independent on the absolute position of the element in the surface. This can be expressed as the phase having a certain increase (or decrease) from one element to the next in the horizontal direction, and another in the vertical direction. That is, in some examples, the description of the first reflection phase defines a phase value of the reflection phase specific for the first local controller 300*a* and a phase gradient for the reflection phase. A local controller may know the relative positions of its elements (i.e., the element subset which it controls) in the RIS 110 so it can calculate their relative phases from the horizontal and vertical increments.

Each local controller is connected to its neighboring local controllers and may be so in all directions (here for non-limiting and illustrative purposes denoted as north, south, east, and west). When a local controller receives a control message from one of its neighboring local controllers, the local controller checks if a new gradient is commanded, i.e., if the gradient is different from its current setting. If the gradient is not different, no action needs to be taken. This implies that the control message is irrelevant and can be ignored. This prevents an irrelevant control message from continuing to propagate in parts of the RIS 110 that have already received the update. If the gradient indicated in the control message is different from its current setting, the local controller will calculate new phase settings for the elements in its element subset, based e.g., on the new gradient and a starting phase told by the control message, and also propagate the control message to other local controllers.

For more complex phase relations than a linear gradient over the full surface, the control message might comprise information such as the expression used to calculate phases, and the local coordinate or starting point for the elements in the RIS 110 managed by that local controller. The control message could also contain local coordinates of the receiving or transmitting local controller. The control message could also contain a more complex equation for the phase, such as a higher order polynomial being a function of both horizontal and vertical coordinates. In particular, in some examples, the description of the first reflection phase is provided in terms of either: an initial phase value specific for the first local controller 300*a* and a phase gradient for the reflection phase, or: a coordinate for the first element subset 114*a* in the RIS 110 and coefficients of an expression for calculating a phase value of the reflection phase of an element at the coordinate in the RIS 110. In some examples the first element subset 114*a* contains a plurality of the elements, where an individual reflection phase is set for each of the plurality of elements. The description of the first reflection phase might then still specify the reflection phase for exactly one of the plurality of elements, but where the reflection phase for this exactly one of the plurality of elements is used as reference when setting the reflection phase for the remaining elements in the first element subset 114*a*.

Figure 4:
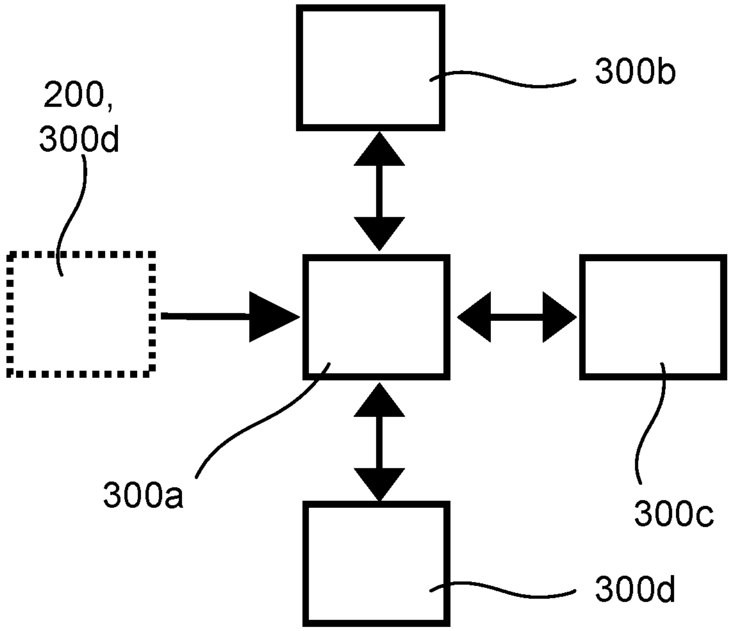
FIG. 4 is a schematic illustration of controllers according to embodiments.

A control message may also set a different scope of the gradient such as creating a limit on the area of the RIS 110 where the elements need to be set up. This will later be referred to as a region of validity. Upon having checked the control message, the local controller passes the control message to its other ports, informing its neighboring local controllers about the new gradient and calculating starting phases or local coordinates for the neighbors. For instance, the starting phase could be of the south-west corner when communication with the east and north ports, and the north-east corner when communicating with the west and south ports, respectively. The connections could be to all available neighboring local controllers, or some could be left non-connected, as long as the control message is enabled to propagate to all intended parts of the RIS 110. Reference is here made to FIG. 4 which illustrates connections between local controllers 300*a*:300*d*. As illustrated in FIG. 4, the (first) control message as received by the (first) local controller 300*a* is received either from a fourth local controller 300*d* of the neighbouring local controllers 300*b*:300K or from the central controller 200 of the RIS 110. In some examples, the local controllers 300*a*:300K are configured to communicate the control messages with neighbouring local controllers 300*b*:300K over bi-directional connections. By having bi-directional connections and connections with several neighboring local controllers, the control messages can propagate in many different paths through the system. This creates robustness. Even if some local controllers might malfunction, this does not prevent the element subsets of other local controllers in the RIS 110 from being updated.

Figure 5:
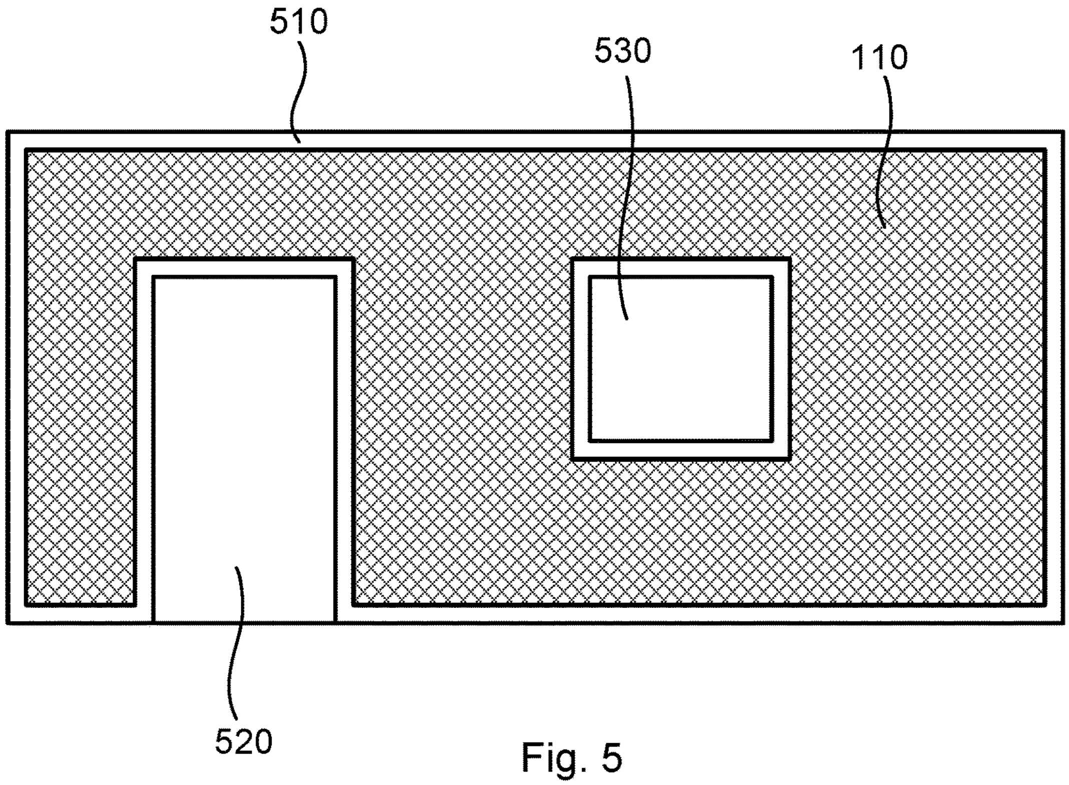
FIG. 5 is a schematic illustration of an RIS according to embodiments.

It also creates flexibility in shape, as schematically illustrated in FIG. 5, where a wall 510 with a door 520 and a window 530 can be covered with an RIS 110 without complex configuration of the central controller. This represents an example where the RIS 110 has a planar surface over which the elements 112*a*:112M are distributed, and wherein the planar surface has a non-rectangular, and/or non-symmetrical shape.

This architecture is scalable, so that the size of the RIS 110 can be changed by just adding more element subsets with respective local controllers. Further, the shape of the RIS 110 can be made flexible; each element subset and its local controller can be regarded as a tile. To increase the degrees of freedom even further, the distance between tiles can be flexible, so that when a local controller calculates the starting phase for its neighboring local controller, a distance offset (e.g. as read from a non-volatile memory) is used, rather than assuming the same distance as between elements within its own element subset.

The control message can contain a high-resolution gradient, such as a phase increment in horizontal and vertical direction, together with a high-resolution starting phase of a certain element of the local controller receiving the control message, or a high-resolution phase of a certain element of the local controller transmitting the control message. Further, the phase increment in horizontal and vertical direction may not be an integer multiple of the phase control resolution of an element. A higher resolution phase can be used internally by the local controllers. Quantization is then performed to obtain the actual phase settings of the elements. Hence, in some examples, setting the reflection phase of each element in the first element subset 114*a* in accordance with the description of the first reflection phase comprises the local controller 300*a* to quantize the phase value of the reflection phase specific for the local controller 300*a*. This enables an increased effective resolution of the phase gradient of the system.

To reconfigure the RIS 110, the control message can, in one or more examples, be sent to any local controller in the system. In one or more examples, for the fastest reconfiguration, one local controller near the center of the RIS 110 might be selected, so that the information of the control message can then propagate in all directions.

One of the ports of the selected local controller is connected to the central controller. For even faster response (and/or a very large RIS 110), the central controller might provide control messages to more than one local controller, so the control message can spread from multiple points. This could be the case where quick updates are needed, e.g., for the RIS 110 to participate in beam scans or beam tracking. Therefore, the central controller might be configured to send a second control message towards a second local controller 300*b* of the local controllers 300*a*:300K, where the second control message comprises a description of a second reflection phase specific for a second element subset 114*b* whose reflection phases are controlled by the second local controller 300*b*. An example of such a system is illustrated by the dotted lines in FIG. 3, where there are four injection points in the RIS 110. This also adds to the robustness, as the system is more vulnerable to damages close to, or at, the local controllers where the control message is injected from the central controller. The central controller must have access to geometric information about the RIS 110. Otherwise, discontinuities might form between element subsets receiving updates from different injection points.

In one or more examples, the control message may describe a linear phase shift over the RIS 110, i.e., a phase gradient. The control message might then also contain a starting phase, so that the local controllers know where the previous local controller expects the phase gradient to continue. This is important to avoid discontinuities between element subsets belonging to different local controllers, so that the RIS 110 behaves like a single surface where all elements contribute constructively to the desired reflection. The control message should then contain either the phase of the transmitting local controller, or the expected phase of the receiving local controller. Both alternatives are viable, and it should be decided which alternative to use and stay with that in the entire RIS 110. It should also be decided where in the element subset of the receiving or transmitting local controller the starting phase is specified. For instance, it could be at the center of the element subset, or it could be in the middle of a side, like in the middle of the east side when communication with the neighboring local controller in the east, or it could be in a corner element, again depending on communication direction of the control message.

In other examples the control message could describe a more complex function for the phase, such as a higher order polynomial in the two coordinates of the local controller. Rather than starting phase the control message should then comprise coordinates, and when passing the control message on to neighboring local controllers the coordinates of the control message are updated, in similar ways as the starting phase. The coordinates of the receiving or transmitting local controller are then calculated and included in the control message, and similar points as for starting phase could be used, like center of the element subset, center of sides, and corners.

When coordinates are calculated and passed, the control message might further comprise information of regions of validity, so that only elements in certain regions of the RIS 110 are updated. The description of the first reflection phase might then be valid only for elements in the region of validity of the RIS 110, where the region of validity defines a subset of the elements within the RIS 110. The checking of validity could be performed either at the receiving or transmitting local controller. If checked at the receiving local controller, upon receiving the control message it should be checked if the local controller is in the valid area, and if it is not, the control message should be ignored. If instead checked at the transmitting local controller, before transmitting any control message it should be checked which neighboring local controllers have element subsets in the valid area, and only make a transmission to these local controllers.

Figure 6:
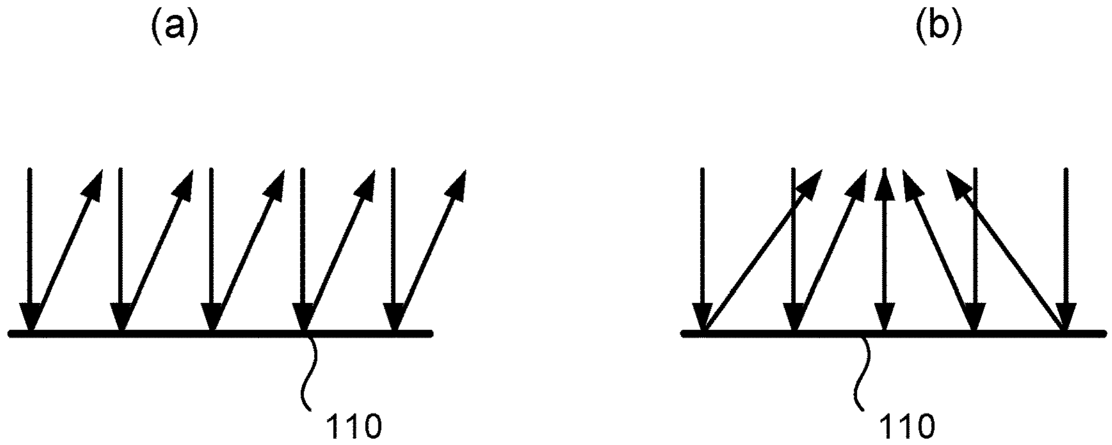
FIG. 6 is a schematic illustration of reflection in an RIS according to embodiments.

With a linear phase gradient over the RIS 110 an incoming planar wave will be reflected into another planar wave, where the direction of the main lobes can be different from that of a mirror in the same plane as the RIS 110. Reference is here made to FIG. 6 which by means of arrows representing the wave front of incoming and outgoing radio waves to/from the RIS 110 schematically illustrates the reflection angles of an RIS 110 according to two examples. If all elements have the same phase setting, the RIS 110 will behave as a regular mirror, but if a phase gradient is introduced, this provides the possibility to steer the reflection into other directions (see, FIG. 6(*a*)). If non-linear phase functions are introduced, the RIS 110 can be configured to behave as a curved mirror, concentrating the radio waves into space (see, FIG. 6(*b*)).

Figure 7:
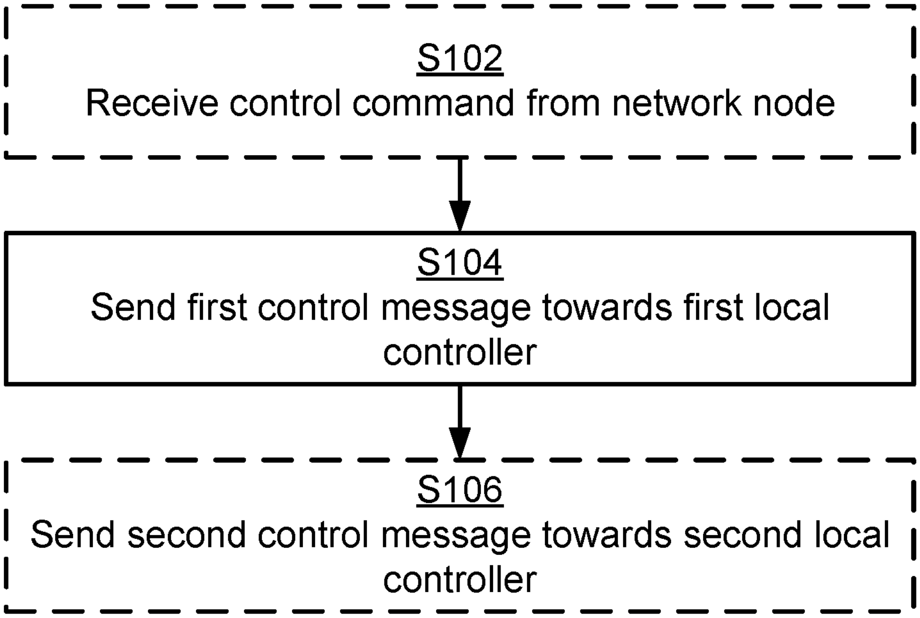

Reference is now made to FIG. 7 illustrating a method for setting reflection phases of elements 112*a*:112M of an RIS 110 as performed by the central controller 200 of the RIS 110 according to an embodiment. The elements 112*a*:112M are divided into element subsets 114*a*:114*d* with at least two elements 112*a*:112M per element subset 114*a*:114*d*. The reflection phase per each of the elements 112*a*:112M in each element subset 114*a*:114*d* are controlled by a respective local controller 300*a*:300K of each element subset 114*a*:114*d*. The central controller 200 is configured to communicate control messages with the local controllers 300*a*:300K.

S104: The central controller 200 sends a first control message towards a first local controller 300*a* of the local controllers 300*a*:300K. The first control message comprises a description of a first reflection phase specific for a first element subset 114*a* whose reflection phases are controlled by the first local controller 300*a*.

As disclosed above, the central controller might comprise a receiver to obtain commands from other devices, such as network nodes 120, in the communication network. The central controller 200 might then be configured to perform (optional) step S102.

S102: The central controller 200 receives a control command from a wireless device or a network node 120. The control command comprises configuration for setting the reflection phase of the elements 112*a*:112M of the RIS 110. The description of the first reflection phase is set according to the configuration.

As disclosed above, the central controller might provide control messages to more than one local controller, so the control message can spread from multiple points. The central controller 200 might then be configured to perform (optional) step S106.

S106: The central controller 200 sends a second control message towards a second local controller 300*b* of the local controllers 300*a*:300K, where the second control message comprises a description of a second reflection phase specific for a second element subset 114*b* whose reflection phases are controlled by said second local controller 300*b*.

Figure 8:
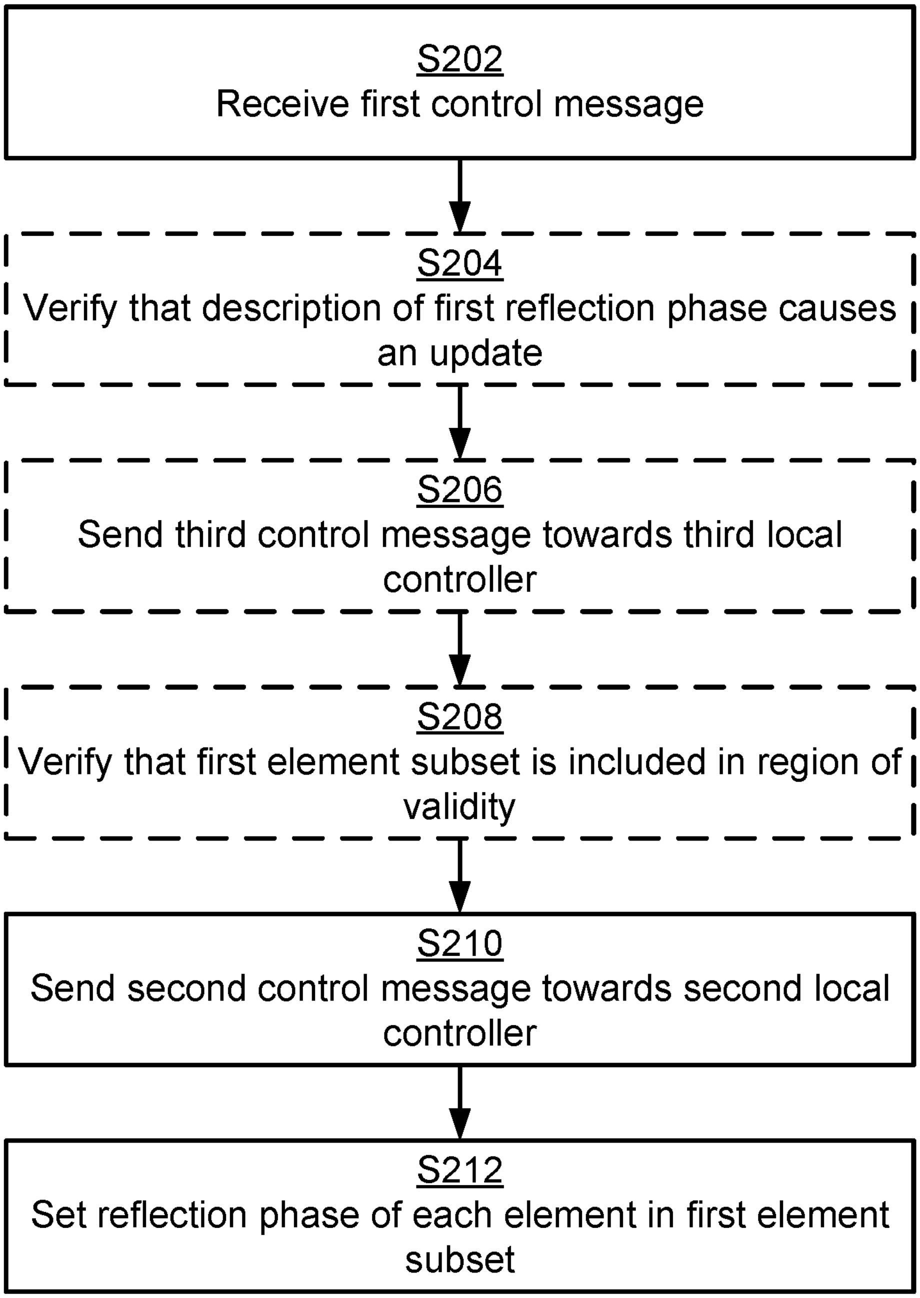
FIGS. 8 and 9 are flowcharts of methods according to embodiments.

Reference is now made to FIG. 8 illustrating a method for setting reflection phases of elements 112*a*:112M of an RIS 110 as performed by the local controller 300*a* of the RIS 110 according to an embodiment. The local controller 300*a* is configured to set the reflection phases of elements 112*a*:112M in a first element subset 114*a* comprising at least two of the elements 112*a*:112M. The local controller 300*a* is configured to communicate control messages with neighbouring local controllers 300*b*:300K of the RIS 110. Each of the neighbouring local controllers 300*b*:300K is configured to set the reflection phases of elements 112*a*:112M in a respective second element subset 114_b_:114_d_, with at least two elements 112_a_:112M per each of the second element subset 114_b_:114_d_.

S202: The local controller 300_a_ receives a first control message. The first control message comprises a description of a first reflection phase specific for the first element subset 114_a_.

S210: The local controller 300_a_ sends a second control message towards a second local controller 300_b_ of the neighbouring local controllers 300_b_:300K. The second control message comprises a description of a second reflection phase specific for the second element subset 114_b_ of the second local controller 300_b_. The second reflection phase is based on the first reflection phase and a geometric relation in the RIS 110 between the first element subset 114_a_ and the second element subset 114_b_ of the second local controller 300_b_.

S212: The local controller 300_a_ sets the reflection phase of each element in the first element subset 114_a_ in accordance with the description of the first reflection phase.

As disclosed above, the local controller might check if a new gradient is commanded, i.e., if the gradient is different from its current setting. The local controller 300_a_ might then be configured to perform (optional) step S204.

S204: The local controller 300_a_ verifies that the description of the first reflection phase causes an update to a most recently sent description of the second reflection phase before sending the second control message.

As disclosed above, the description of the first reflection phase might be valid only for elements in a region of validity of the RIS 110. The local controller 300_a_ might then be configured to perform (optional) step S206.

S206: The local controller 300_a_ verifies that the first element subset 114_a_ is included in the elements in the region of validity before setting the reflection phase of each element in the first element subset 114_a_.

As disclosed above, the local controller 300_a_ might communicate control messages with more than one other local controller. The local controller 300_a_ might then be configured to perform (optional) step S208.

S208: The local controller 300_a_ sends a third control message towards a third local controller 300_c_ of the neighbouring local controllers 300_b_:300K. The third control message comprises a description of a third reflection phase specific for the second element subset 114_b_ of the third local controller 300_c_. The third reflection phase is based on the first reflection phase and a geometric relation in the RIS 110 between the first element subset 114_a_ and the second element subset 114_b_ of the third local controller 300_c_.

Figure 9:
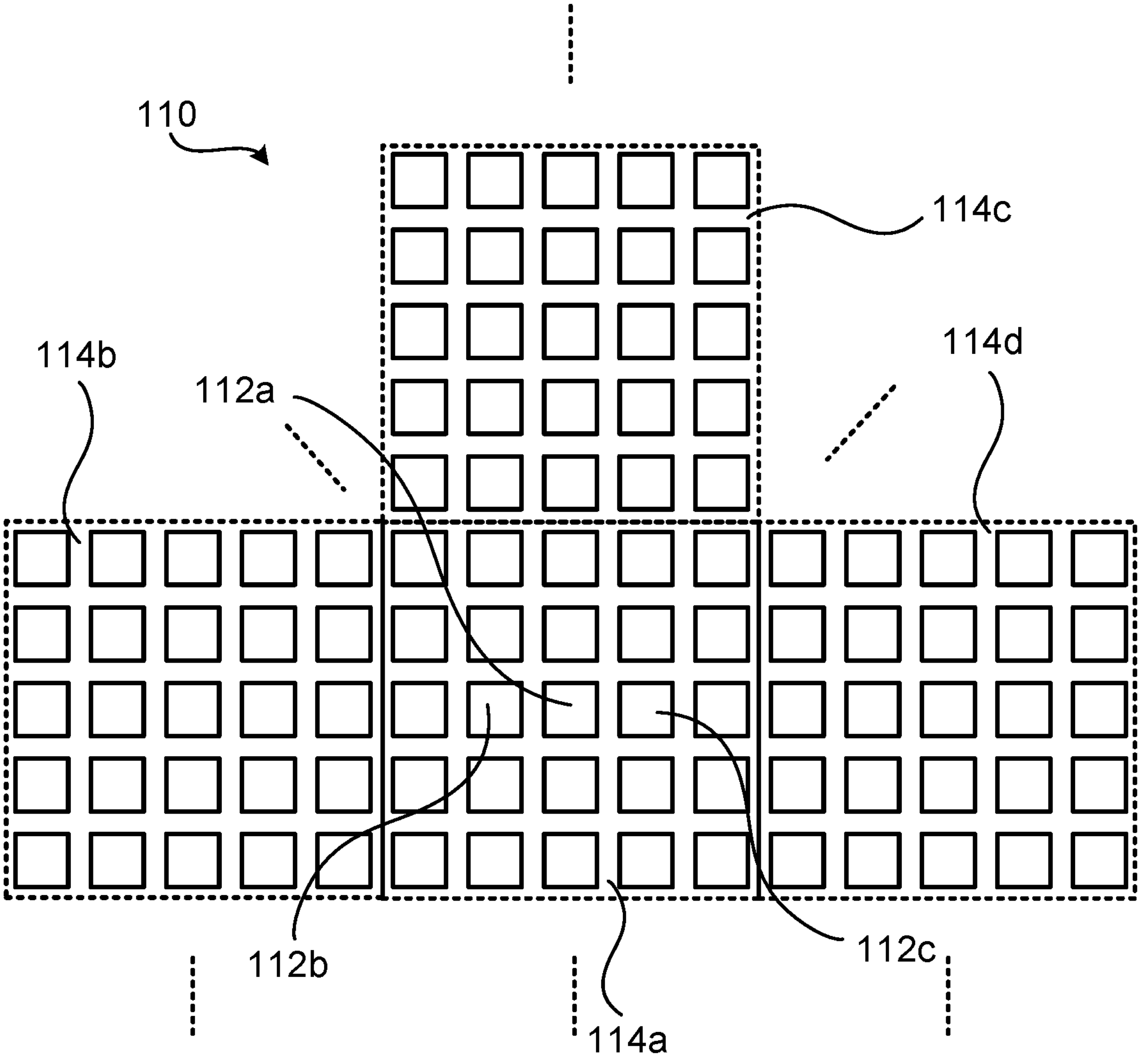

Reference is next made to FIG. 9 for illustrating how the phases of elements 112_a_:112M of an RIS 110 can be set. In FIG. 9 is illustrated four element subsets 114_a_:114_d_ of a RIS 110, where each element subset 114_a_:114_d_ is controlled by its own local controller (not shown). In turn, each element subset 114_a_:114_d_ is composed of 25 elements, provided in 5 -by-5 sub-arrays, where three elements of element subset 114_a_ are identified at reference numerals 112_a_, 112_b_, and 112_c_.

Consider the situation where the local controller of element subset 114_a_ is to propagate the control message to its neighbors to the north, east, and west, i.e., to the local controllers of element subsets 114_c_, 114_d_, and 114_b_, respectively. Assume further that the gradient is in this case 21 degrees increase per element in direction north, and 7 degrees in direction east. Assume further that the phase of the center element in each element subset is used when communicating control messages, and that the expected receiver phase is used. Element 112_a_ is the center element in element subset 114_a_. Assume further that that the local controller for element subset 114_a_ has just received this gradient information, together with the information that the center element 112_a_ should be at 57 degrees. It is further assumed that this is a new value that should propagated through element subset 114_a_ and be provided to the local controllers of element subsets 114_b_, 114_c_, and 114_d_.

Towards the west, i.e., to the local controller of element subset 114_b_, the center element phase will be equal to the actual center element phase, minus the increment times 5 (where 5 is the center-to-center distance between two 5-by-5 sub-arrays), which amounts to $57-7\times5=57-35=22$ degrees. Hence, the control message with the new gradient sent to the local controller of element subset 114_b_ will specify the center element phase 22 degrees. In the control message sent to the north (i.e., to the local controller of element subset 114_c_) the center element phase will be $57+21\times5=57+105=162$ degrees. In the control message sent to the east (i.e., to the local controller of element subset 114_d_) the center element phase will be $57+35=92$ degrees. Each local controller can then, based on the received center element phase and gradient calculate the phase value of each of the rest of the elements in its element subset, and apply after quantizing to the resolution of the phase shifters. Should a phase value exceed 360 degrees, 360 degrees can be subtracted from the result, and if a phase result is negative, then 360 degrees can be added to the result. This guarantees that each phase value will be in the interval from 0 to 360 degrees. Alternatively, subtractions and additions could be applied to maintain all the phase values within +180 and −180 degrees.

In summary, at least some embodiments have disclosed control of an RIS 110 using a set of distributed local controllers of equal design, where each local controller is configured to set the reflection phase of its own element subset and to propagate control messages elements to neighboring local controllers. The control messages are initially sent to one or a few of the local controllers from the central controller and then propagated, from one local controller to one or more other local controllers, over interconnections, until the elements of the full RIS 110 have been updated.

Figure 10:
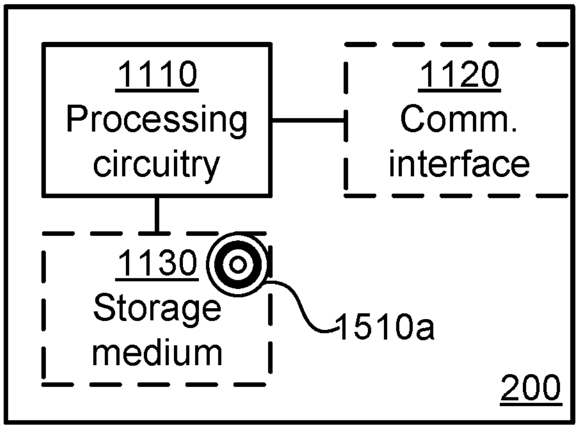
FIG. 10 is a schematic diagram showing functional units of a central controller according to an embodiment.

FIG. 10 schematically illustrates, in terms of a number of functional units, the components of a central controller 200 according to an embodiment. Processing circuitry 1110 is provided using any combination of one or more of a suitable central processing unit (CPU), multiprocessor, microcontroller, digital signal processor (DSP), etc., capable of executing software instructions stored in a computer program product 1510_a_ (as in FIG. 14), e.g. in the form of a storage medium 1130. The processing circuitry 1110 may further be provided as at least one application specific integrated circuit (ASIC), or field programmable gate array (FPGA).

Particularly, the processing circuitry 1110 is configured to cause the central controller 200 to perform a set of operations, or steps, as disclosed above. For example, the storage medium 1130 may store the set of operations, and the processing circuitry 1110 may be configured to retrieve the set of operations from the storage medium 1130 to cause the central controller 200 to perform the set of operations. The set of operations may be provided as a set of executable instructions. Thus the processing circuitry 1110 is thereby arranged to execute methods as herein disclosed.

The storage medium 1130 may also comprise persistent storage, which, for example, can be any single one or combination of magnetic memory, optical memory, solid state memory or even remotely mounted memory.

The central controller 200 may further comprise a communications interface 1120 for communications with a network node 120 and at least one of the local controllers 300*a*:300*d*. As such the communications interface 1120 may comprise one or more transmitters and receivers, comprising analogue and digital components.

The processing circuitry 1110 controls the general operation of the central controller 200 e.g. by sending data and control signals to the communications interface 1120 and the storage medium 1130, by receiving data and reports from the communications interface 1120, and by retrieving data and instructions from the storage medium 1130. Other components, as well as the related functionality, of the central controller 200 are omitted in order not to obscure the concepts presented herein.

Figure 11:
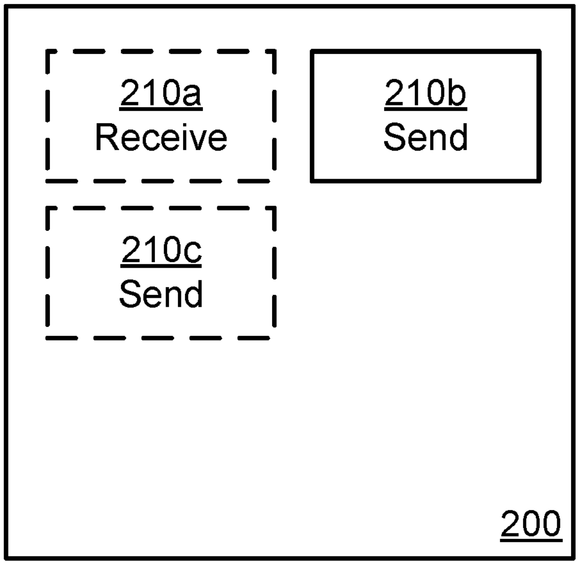
FIG. 11 is a schematic diagram showing functional modules of a central controller according to an embodiment.

FIG. 11 schematically illustrates, in terms of a number of functional modules, the components of a central controller 200 according to an embodiment. The central controller 200 of FIG. 11 comprises a send module 210*b* configured to perform step S104. The central controller 200 of FIG. 11 may further comprise a number of optional functional modules, such as any of a receive module 210*a* configured to perform step S102 and a send module 210*c* configured to perform step S106. In general terms, each functional module 210*a*:210*c* may be implemented in hardware or in software. Preferably, one or more or all functional modules 210*a*:210*c* may be implemented by the processing circuitry 1110, possibly in cooperation with the communications interface 1120 and/or the storage medium 1130. The processing circuitry 1110 may thus be arranged to from the storage medium 1130 fetch instructions as provided by a functional module 210*a*:210*c* and to execute these instructions, thereby performing any steps of the central controller 200 as disclosed herein.

Figure 12:
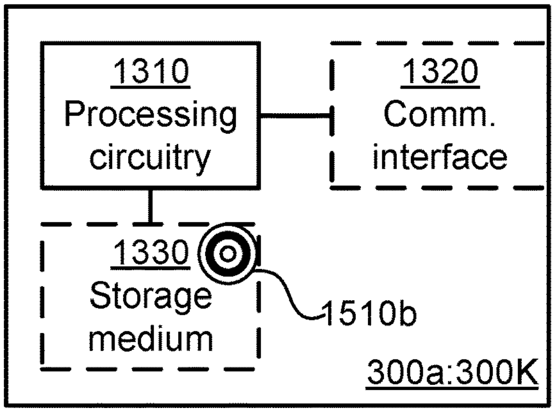
FIG. 12 is a schematic diagram showing functional units of a local controller according to an embodiment.

FIG. 12 schematically illustrates, in terms of a number of functional units, the components of a local controller 300*a* according to an embodiment. Processing circuitry 1310 is provided using any combination of one or more of a suitable central processing unit (CPU), multiprocessor, microcontroller, digital signal processor (DSP), etc., capable of executing software instructions stored in a computer program product 1510*b* (as in FIG. 14), e.g. in the form of a storage medium 1330. The processing circuitry 1310 may further be provided as at least one application specific integrated circuit (ASIC), or field programmable gate array (FPGA).

Particularly, the processing circuitry 1310 is configured to cause the local controller 300*a* to perform a set of operations, or steps, as disclosed above. For example, the storage medium 1330 may store the set of operations, and the processing circuitry 1310 may be configured to retrieve the set of operations from the storage medium 1330 to cause the local controller 300*a* to perform the set of operations. The set of operations may be provided as a set of executable instructions. Thus the processing circuitry 1310 is thereby arranged to execute methods as herein disclosed.

The storage medium 1330 may also comprise persistent storage, which, for example, can be any single one or combination of magnetic memory, optical memory, solid state memory or even remotely mounted memory.

The local controller 300*a* may further comprise a communications interface 1320 for communications with the elements of its own element subset, with other local controllers 300*b*:300*d*, possibly also with the central controller 200. As such the communications interface 1320 may comprise one or more transmitters and receivers, comprising analogue and digital components.

The processing circuitry 1310 controls the general operation of the local controller 300*a* e.g. by sending data and control signals to the communications interface 1320 and the storage medium 1330, by receiving data and reports from the communications interface 1320, and by retrieving data and instructions from the storage medium 1330. Other components, as well as the related functionality, of the local controller 300*a* are omitted in order not to obscure the concepts presented herein.

Figure 13:
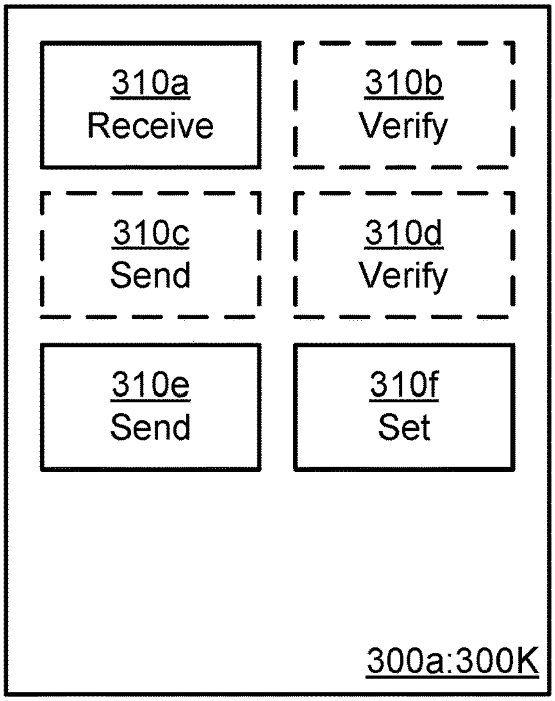
FIG. 13 is a schematic diagram showing functional modules of a local controller according to an embodiment.

FIG. 13 schematically illustrates, in terms of a number of functional modules, the components of a local controller 300*a* according to an embodiment. The local controller 300*a* of FIG. 13 comprises a number of functional modules; a receive module 310*a* configured to perform step S202, a send module 310*e* configured to perform step S210, and a set module 310*f* configured to perform step S212. The local controller 300*a* of FIG. 13 may further comprise a number of optional functional modules, such as any of a verify module 310*b* configured to perform step S204, a send module 310*c* configured to perform step S206, and a verify module 310*d* configured to perform step S208. In general terms, each functional module 310*a*:31*f* may be implemented in hardware or in software. Preferably, one or more or all functional modules 310*a*:310*f* may be implemented by the processing circuitry 1310, possibly in cooperation with the communications interface 1320 and/or the storage medium 1330. The processing circuitry 1310 may thus be arranged to from the storage medium 1330 fetch instructions as provided by a functional module 310*a*:310*f* and to execute these instructions, thereby performing any steps of the local controller 300*a* as disclosed herein.

Figure 14:
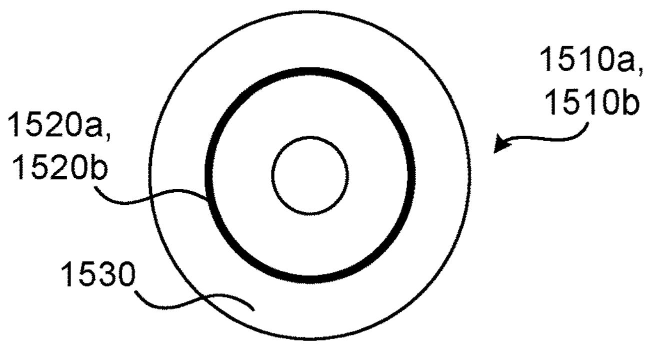
FIG. 14 shows one example of a computer program product comprising computer readable means according to an embodiment.

FIG. 14 shows one example of a computer program product 1510*a*, 1510*b* comprising computer readable means 1530. On this computer readable means 1530, a computer program 1520*a* can be stored, which computer program 1520*a* can cause the processing circuitry 1110 and thereto operatively coupled entities and devices, such as the communications interface 1120 and the storage medium 1130, to execute methods according to embodiments described herein. The computer program 1520*a* and/or computer program product 1510*a* may thus provide means for performing any steps of the central controller 200 as herein disclosed. On this computer readable means 1530, a computer program 1520*b* can be stored, which computer program 1520*b* can cause the processing circuitry 1310 and thereto operatively coupled entities and devices, such as the communications interface 1320 and the storage medium 1330, to execute methods according to embodiments described herein. The computer program 1520*b* and/or computer program product 1510*b* may thus provide means for performing any steps of the local controller 300*a* as herein disclosed.

In the example of FIG. 14, the computer program product 1510*a*, 1510*b* is illustrated as an optical disc, such as a CD (compact disc) or a DVD (digital versatile disc) or a Blu-Ray disc. The computer program product 1510*a*, 1510*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520*a*, 1520*b* is here schematically shown as a track on the depicted optical disk, the computer program 1520*a*, 1520*b* can be stored in any way which is suitable for the computer program product 1510*a*, 1510*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A local controller for setting reflection phases of elements of a reconfigurable intelligent surface, the local controller being configured to set the reflection phases of elements in a first element subset comprising at least two of the elements, the local controller being configured to communicate control messages with neighbouring local controllers of the reconfigurable intelligent surface, each of the neighbouring local controllers being configured to set the reflection phases of elements in a respective second element subset, with at least two elements per each of the second element subset, the local controller comprising processing circuitry, and the processing circuitry being configured to cause the local controller to:

receive a first control message, the first control message comprising a description of a first reflection phase specific for the first element subset;

send a second control message towards a second local controller of the neighbouring local controllers, the second control message comprising a description of a second reflection phase specific for the second element subset of the second local controller, and the second reflection phase being based on the first reflection phase and a geometric relation in the reconfigurable intelligent surface between the first element subset and the second element subset of the second local controller; and set the reflection phase of each element in the first element subset in accordance with the description of the first reflection phase.

2. The local controller according to claim 1, wherein the local controller is embedded in, integrated with, or part of, one element in the first element subset.

3. The local controller according to claim 1, wherein the first control message is received either from a fourth local controller of the neighbouring local controllers or from a central controller of the reconfigurable intelligent surface.

4. The local controller according to claim 1, wherein the processing circuitry is configured to cause the local controller to:

verify that the description of the first reflection phase causes an update to a most recently sent description of the second reflection phase before sending the second control message.

5. The local controller according to claim 1, wherein the description of the first reflection phase is valid only for elements in a region of validity of the reconfigurable intelligent surface, and wherein the processing circuitry is configured to cause the local controller to:

verify that the first element subset is included in the elements in the region of validity before setting the reflection phase of each element in the first element subset.

6. The local controller according to claim 1, wherein the description of the first reflection phase defines a phase value of the reflection phase specific for the local controller and a phase gradient for the reflection phase.

7. The local controller according to claim 6, wherein setting the reflection phase of each element in the first element subset in accordance with the description of the first reflection phase comprises quantizing the phase value of the reflection phase specific for the local controller.

8. The local controller according to claim 1, wherein the description of the first reflection phase is provided in terms of either: an initial phase value specific for the local controller and a phase gradient for the reflection phase, or: a coordinate for the first element subset in the reconfigurable intelligent surface and coefficients of an expression for calculating a phase value of the reflection phase an element at the coordinate in the reconfigurable intelligent surface.

9. The local controller according to claim 1, wherein the first element subset contains a plurality of the elements, and wherein an individual reflection phase is set for each of the plurality of elements.

10. The local controller according to claim 9, wherein the description of the first reflection phase specifies the reflection phase for exactly one of the plurality of elements, and wherein the reflection phase for said exactly one of the plurality of elements is used as reference when setting the reflection phase for the remaining elements in the first element subset.

11. The local controller according to claim 1, wherein the processing circuitry is configured to cause the local controller to:

send a third control message towards a third local controller of the neighbouring local controllers, wherein the third control message comprises a description of a third reflection phase specific for the second element subset of the third local controller and wherein the third reflection phase is based on the first reflection phase and a geometric relation in the reconfigurable intelligent surface between the first element subset and the second element subset of the third local controller.

12. The local controller according to claim 1, wherein the local controller is configured to communicate the control messages with the neighbouring local controllers over bi-directional connections.

13. The local controller according to claim 2, wherein the first control message is received either from a fourth local controller of the neighbouring local controllers or from a central controller of the reconfigurable intelligent surface.

14. The local controller according to claim 2, wherein the processing circuitry is configured to cause the local controller to:

verify that the description of the first reflection phase causes an update to a most recently sent description of the second reflection phase before sending the second control message.

15. The local controller according to claim 2, wherein the description of the first reflection phase is valid only for elements in a region of validity of the reconfigurable intelligent surface, and wherein the processing circuitry is configured to cause the local controller to:

verify that the first element subset is included in the elements in the region of validity before setting the reflection phase of each element in the first element subset.

16. The local controller according to claim 2, wherein the description of the first reflection phase defines a phase value of the reflection phase specific for the local controller and a phase gradient for the reflection phase.

17. The local controller according to claim 16, wherein setting the reflection phase of each element in the first element subset in accordance with the description of the first reflection phase comprises quantizing the phase value of the reflection phase specific for the local controller.

18. The local controller according to claim 2, wherein the description of the first reflection phase is provided in terms of either: an initial phase value specific for the local controller and a phase gradient for the reflection phase, or: a coordinate for the first element subset in the reconfigurable intelligent surface and coefficients of an expression for calculating a phase value of the reflection phase an element at the coordinate in the reconfigurable intelligent surface.

19. A system for setting reflection phases of elements of a reconfigurable intelligent surface the system comprising:

a central controller, the central controller for setting reflection phases of elements of a reconfigurable intelligent surface, the elements being divided into element subsets with at least two elements per element subset, where the reflection phase per each of the elements in each element subset are controlled by a respective local controller of each element subset, the central controller being configured to communicate control messages with the local controllers, the central controller comprising processing circuitry, the processing circuitry being configured to cause the central controller to:

send a first control message towards a first local controller of the local controllers, wherein the first control message comprises a description of a first reflection phase specific for a first element subset whose reflection phases are controlled by said first local controller; and at least one local controller for setting reflection phases of elements of a reconfigurable intelligent surface, the local controller being configured to set the reflection phases of elements in a first element subset comprising at least two of the elements, the local controller being configured to communicate control messages with neighbouring local controllers of the reconfigurable intelligent surface, each of the neighbouring local controllers being configured to set the reflection phases of elements in a respective second element subset, with at least two elements per each of the second element subset, the local controller comprising processing circuitry, and the processing circuitry being configured to cause the local controller to:

receive a first control message, the first control message comprising a description of a first reflection phase specific for the first element subset;

send a second control message towards a second local controller of the neighbouring local controllers, the second control message comprising a description of a second reflection phase specific for the second element subset of the second local controller, and the second reflection phase being based on the first reflection phase and a geometric relation in the reconfigurable intelligent surface between the first element subset and the second element subset of the second local controller; and set the reflection phase of each element in the first element subset in accordance with the description of the first reflection phase.

20. A method for setting reflection phases of elements of a reconfigurable intelligent surface, the method being performed by a local controller of the reconfigurable intelligent surface, the local controller being configured to set the reflection phases of elements in a first element subset comprising at least two of the elements, the local controller being configured to communicate control messages with neighbouring local controllers of the reconfigurable intelligent surface, each of the neighbouring local controllers being configured to set the reflection phases of elements in a respective second element subset, with at least two elements per each of the second element subset, the method comprising:

receiving a first control message, the first control message comprising a description of a first reflection phase specific for the first element subset;

sending a second control message towards a second local controller of the neighbouring local controllers, the second control message comprising a description of a second reflection phase specific for the second element subset of the second local controller, the second reflection phase being based on the first reflection phase and a geometric relation in the reconfigurable intelligent surface between the first element subset and the second element subset of the second local controller; and setting the reflection phase of each element in the first element subset in accordance with the description of the first reflection phase.

* * * * *